United States Patent [19]

Fraden

[11] Patent Number: 5,368,038
[45] Date of Patent: Nov. 29, 1994

[54] OPTICAL SYSTEM FOR AN INFRARED THERMOMETER

[75] Inventor: Jacob Fraden, San Diego, Calif.

[73] Assignee: Thermoscan Inc., San Diego, Calif.

[21] Appl. No.: 27,979

[22] Filed: Mar. 8, 1993

[51] Int. Cl.$^5$ .............................................. A61B 6/00
[52] U.S. Cl. ................................. 128/664; 128/736; 374/131
[58] Field of Search ................ 128/664, 736; 374/121, 374/130, 131, 133

[56] References Cited

U.S. PATENT DOCUMENTS

| | | | |
|---|---|---|---|
| 3,586,439 | 6/1971 | Treharne et al. | 356/43 |
| 3,641,332 | 2/1972 | Reick et al. | 128/20 |
| 4,005,605 | 2/1977 | Michael | 73/355 R |
| 4,505,542 | 3/1985 | Clarke | 350/96.33 |
| 4,797,840 | 1/1989 | Fraden | 364/557 |
| 5,167,235 | 12/1992 | Seacord et al. | 128/664 |

FOREIGN PATENT DOCUMENTS 2119925  11/1983  United Kingdom .

*Primary Examiner*—Ruth S. Smith
*Attorney, Agent, or Firm*—Hopgood, Calimafde, Kalil & Judlowe

[57] ABSTRACT

An optical infrared thermometer has a sole core, refractive rod waveguide in an optical path between the infrared reception portion of the thermometer and the infrared sensor of the thermometer.

18 Claims, 3 Drawing Sheets

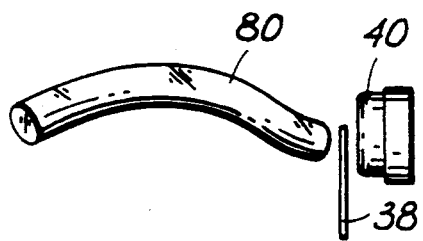
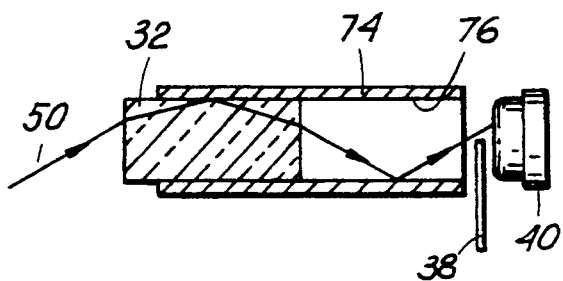
FIG. 3                    FIG. 4
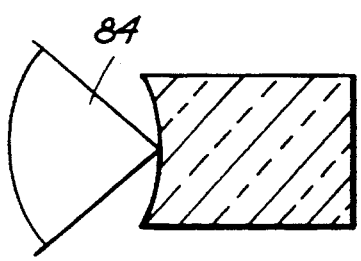
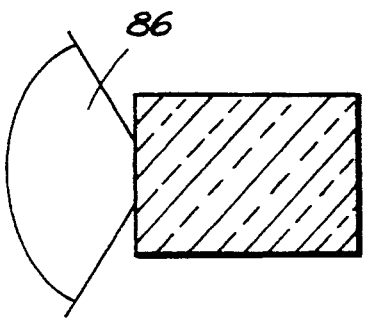
FIG. 5                    FIG. 6
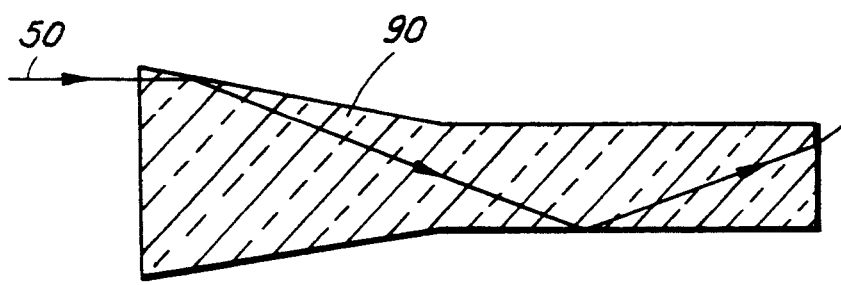
FIG. 7
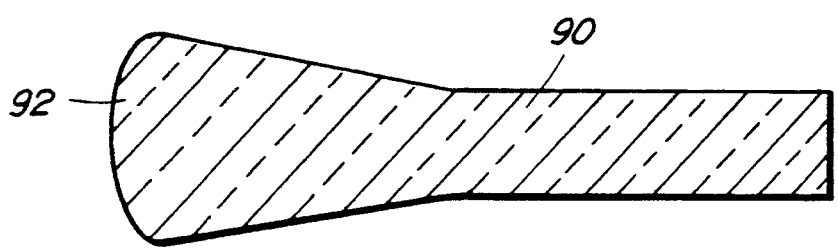
FIG. 8

OPTICAL SYSTEM FOR AN INFRARED THERMOMETER

BACKGROUND OF THE INVENTION

1. Field of the Invention

The present invention relates to infrared thermometers, more particularly to an infrared thermometer which uses an optical waveguide.

2. Description of the Prior Art

Sensing of infrared emission to measure temperature can be undertaken by one of many sensors known to the art, such as thermopiles, pyroelectrics, bolometers, and active infrared sensors. An infrared sensor generates an electrical signal which is representative of two temperatures. One is the surface temperature of the sensor $T_s$, and the other is the temperature of the object or target $T_b$. The relationship between these temperatures and the response of the sensor is governed by Stefan-Boltzmann law, $$V = k\epsilon_b\epsilon_s(T_b^4 - T_s^4) \quad 1$$

where V is the output signal of the sensor, $\epsilon_b$ and $\epsilon_s$ are emissivities of the target and sensor respectively, and k is a constant.

The ultimate goal of non-contact temperature measurement as in an optical infrared thermometer is to determine the temperature $T_b$ of the target. It is seen from equation 1, that to calculate $T_b$, one must first determine two numbers, a reading V from the infrared sensor, and the surface temperature $T_s$ of the sensor.

The term "surface temperature" means a surface temperature of a sensing element positioned inside the sensor's packaging.

Obtaining the surface temperature of the sensor is not easy. An infrared sensor with a good response speed is generally fabricated in the form of a thin flake or membrane. The surface temperature is not only difficult to measure, but changes upon exposure to a target. Inaccurate determination of the surface temperature $T_s$ of a sensor results in an erroneous temperature measurement.

In order to overcome the problem, an alternative method of measuring temperature $T_b$ was developed. Instead of measuring the temperature of surface $T_s$, temperature $T_a$ of a reference target is employed. Usually, measurement of $T_a$ can be performed with better accuracy. Therefore, equation 1 is modified to be:

$$V = k\epsilon_b\epsilon_s(T_b^4 - T_a^4)$$

In some inventions, such as the one described in U.S. Pat. No. 4,005,605 patented by Michael, the reference target is a cavity inside the thermometer. In U.S. Pat. No. 4,797,840, patented by Fraden, a fast moving shutter which occludes the sensor's field of view before measurement, serves as a reference target.

In any case, temperature of a reference target $T_a$ must be measured with high accuracy before it can be fed into equation 2 for calculating $T_b$. Since that equation demands measurement of two independent variables V and $T_a$, at least two sensors must be used in any infrared thermometer. One sensor is called the infrared sensor. It produces electrical signal V representative of the magnitude of thermal (infrared) radiation. The other sensor, often called the "ambient sensor", produces a signal representative of the temperature of a reference target $T_a$ which may come in one of many shapes and designs.

In many infrared thermometers and pyrometers, thermal radiation is measured by a thermoelectric device called a thermopile. In the above mentioned U.S. Pat. No. 840 Fraden, a pyroelectric detector in combination with a mechanical shutter is employed for that purpose.

In order to measure signal V, a definite and undisturbed volume of thermal radiation must reach the infrared sensor. The radiation is situated primarily in the far infrared (IR) spectral range. It must be channeled to the sensor by means of an optical system which is adapted to that specific range.

This invention is concerned with an element in the optical system path that channels infrared radiation between the reception portion of the thermometer and the sensor system in the body of the thermometer.

In a typical medical infrared thermometer which collects infrared radiation from a tympanic membrane and surrounding tissue within the human ear, the radiation is channeled by means of a waveguide which is a hollow tube with a highly reflective inner surface, as described in Fraden '840. Use of the reflective tube allows fabrication of a probe which can be inserted into the ear canal while keeping the infrared sensor and some other essential components such as the reference target, outside of the patient's body.

A reflective tube waveguide works like a mirrored channel in which light rays bounce from the opposite walls of the tube while propagating from one end of the tube to the other end of the tube.

For operation in the infrared range, the mirrored surface is made by polishing the interior of the tube, and applying a thin layer of gold, since gold is an excellent reflector in that spectral range.

For channeling IR radiation to the sensor in nonmedical applications in which the target is not as confined, the prior art teaches use of reflective focusing mirrors as in Michael '605, or lenses as in U.S. Pat. No. 3,586,439 patented by Treharne, or British patent 2 119 925 A, patented by Irani et al.

In measuring temperature in humans and animals, an infrared sensor cannot be positioned directly at the end of the probe. The probe has dimensions that are quite small since the probe should be inserted into an ear canal. In such thermometers, hollow tubular waveguides are presently employed almost exclusively.

There are several potential problems associated with use of a hollow waveguide. They include surface contamination resulting in loss of reflectivity, small but finite emissivity of the reflective surface resulting in stray emissions, a limited angle of view, and substantial signal loss in long waveguides having small diameters.

An approach which circumvents some of the above problems is taught in U.S. Pat. No. 5,167,235 patented by Seacord, in which infrared radiation is channeled to a thermopile sensor through a fiber optic bundle. One drawback of this approach is that optical fibers which operate in the far infrared spectral range are expensive and do not allow for controlling the field of view of the optical probe. This substantially limits use of fiber optic bundles.

SUMMARY OF THE INVENTION

It is one object of the present invention to provide an improved waveguide input, infrared thermometer in which problems associated with hollow waveguides are either reduced or eliminated.

Another object of the present invention is to provide an optical system waveguide for an infrared thermometer.

A further object of the invention is to provide an optical system waveguide in which the field of view is determined by the shape of the waveguide.

The objects of the invention may be achieved by use of a refractive waveguide which preferably is shaped in the form of a solid rod. The central core medium of the refractive waveguide has a higher refractive index than the immediate surrounding of the waveguide, whereby the waveguide is capable of transmitting infrared radiation the length of the waveguide by total internal reflection within the medium.

The waveguide is mounted in the housing of the optical infrared thermometer, in optical alignment with an sensor which generates a signal responsive to infrared radiation received from an object by the thermometer. The waveguide is adapted for directing the radiation in a path toward the sensor for reception by the sensor.

The refractive waveguide preferably has a single core, and is a sequential optical portion of the path.

If desired, the rod can be bent to conduct radiation toward a desired area in the thermometer body.

The front and/or rear ends of the refractive waveguide may be formed with concave or convex profiles to control the angles of entry and exit, thus forming an infrared thermometer with a predetermined field of view. The refractive waveguide may be circular, square, or any desired shape in cross section suitable for the provision of infrared radiation to the sensor.

Refractive and tubular or reflective waveguides may be combined as a unitary optical system to shape a desired field of view or to better interface with the infrared sensor portion of the thermometer.

BRIEF DESCRIPTION OF THE DRAWINGS

In order that the invention be more fully comprehended, it will now be described, by way of example, with reference to the accompanying drawings, in which:

FIG. 3 is a schematic view of an optical system with a curved refractive waveguide according to one embodiment of the present invention.

FIG. 4 is a partial cross section view of a unitary optical system comprising refractive and reflective waveguides, delivering infrared radiation to a sensor, according to the present invention.

FIG. 5 is a cross section view of a refractive waveguide with a convex curved end according to the invention.

FIG. 6 is a cross section view of a refractive waveguide with a flat end according to the invention.

FIG. 7 is a cross section view of a waveguide with a flat end for signal collecting design according to the invention.

FIG. 8 is a cross section view of a waveguide with a convex end for signal collecting design according to the invention.

DESCRIPTION OF THE PREFERRED EMBODIMENTS

Figure 1:
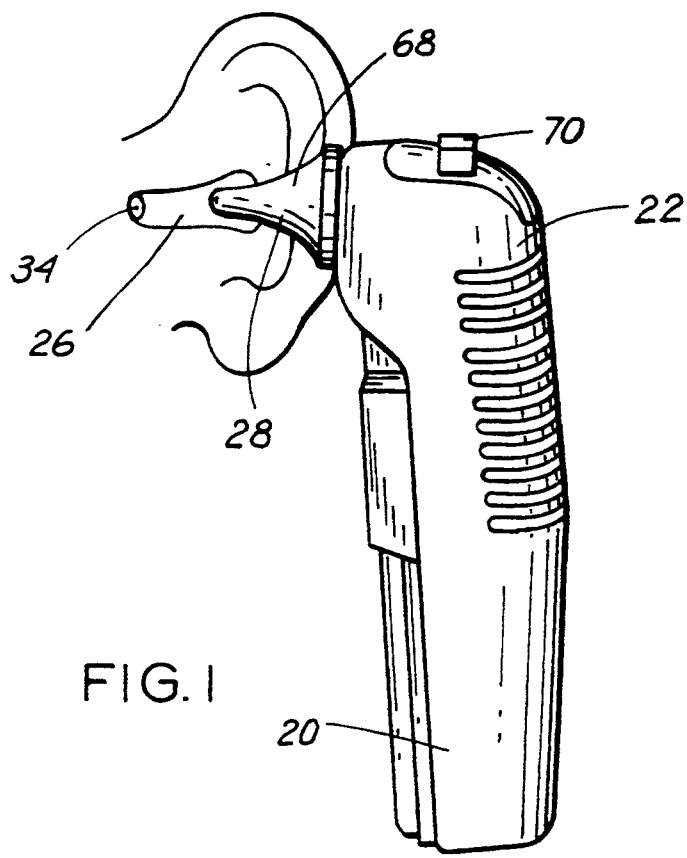
FIG. 1 is a perspective view of a medical infrared thermometer, the probe of which is inserted in an ear canal.

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

The preferred embodiment of the present invention is now described by way of example, by applying it to a medical infrared thermometer having a pyroelectric sensor similar to the thermometer described in Fraden '840, which is incorporated herein by reference Referring to FIG. 1, medical infrared thermometer 20 is a self-contained, battery powered unit which has probe 68 adapted for insertion into an ear canal 26, short of tympanic membrane 34.

Housing 22 of thermometer 20 is shaped for convenient handling. It has an actuation button 70 which when depressed triggers the device to take a reading of the infrared radiation from within canal 26.

Probe 68 at the front of the thermometer is of a shape and dimension that is compatible with the profile of a human ear canal. Before insertion into the canal, probe 68 is covered by protective probe cover 28 which is fabricated of a thin polymer material that is substantially transparent to light in the near and far infrared spectral ranges.

The purpose of the front portion of the probe is to gather infrared light from the tympanic membrane and surrounding tissue. The infrared sensor is remote from the end of the probe, being positioned inside housing 22 of thermometer 20.

Figure 2:
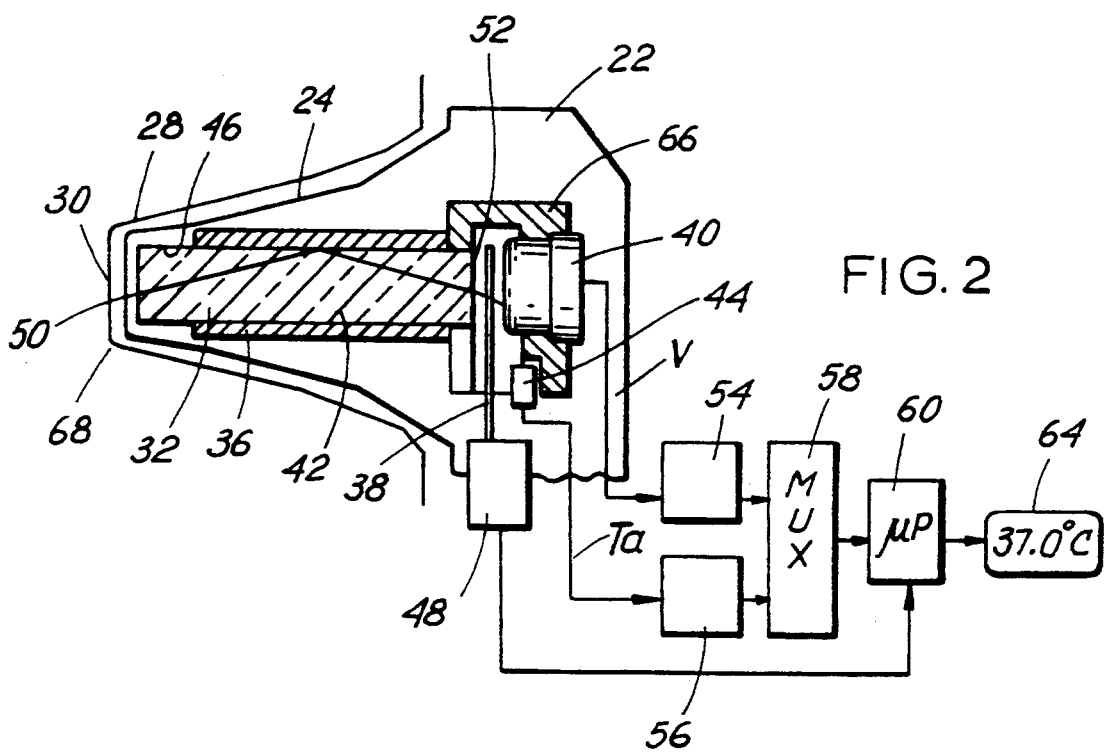
FIG. 2 is a schematic view of a medical infrared thermometer with a pyroelectric sensor according to the present invention.

Referring to FIG. 2, front end 30 of probe 68 and infrared sensor 40 are optically coupled through refractive waveguide 42 which is in the shape of a rod 32. Rod 32 is fabricated of a crystalline or an amorphous material having a small coefficient of absorption in the wavelength of interest and having a refractive index greater than 1, which is high enough to cause total internal reflections along the length of the rod. An example of such a material is AMTIR-1 which is a special glass produced by Amorphous Materials, Inc. This material has a refractive index of 2.5 and an extremely low absorption for light of wavelengths between approximately 2 and 14 $\mu$m.

Infrared ray (IR) 50 entering front end 30 of rod 32 of AMTIR-1 at almost any angle is successfully, totally internally reflected within the rod from inner wall 46, and propagated, or conducted along its length with negligible loss.

Holder 36, which is in intimate contact with rod 32 must have a refractive index at points of contact with the rod that is smaller than the refractive index of the rod, or the rod will loose its inner reflectivity at those points.

Holder 36 is attached to thermal mass 66 which is designed to equalize the temperatures of shutter 38 and ambient sensor 44. Another purpose of the thermal mass is to stabilize the temperature of infrared sensor 40.

The position of shutter 38 is controlled by mechanism 48 which is triggered by activation button 70 (FIG. 1).

The optical assembly comprising rod 32 and holder 36 is positioned within elongated speculum 24 which forms the outer surface of probe 68. Thin front end 30 of probe cover 28 is substantially transparent to IR radiation.

Infrared sensor 40 and ambient sensor 44 are connected to first and second signal conditioners 54 and 56 which are in turn connected to signal multiplexer (MUX) 58. MUX 58 is a gate, intended to conduct an appropriate signal from the conditioners, one at a time, to microprocessor 60. Microprocessor 60 has a built-in analog to digital converter and a driver to control display 64 which displays the calculated temperature of the target such as ear canal 26.

Operation of the thermometer with the refractive waveguide is as follows. Infrared ray 50 from the target ear canal 26 passes through front end 30 of probe cover 28 and enters rod 32. Due to refractive properties of rod 32, IR ray 50 changes its angle and propagates along rod 32 to back end 52 with only slight absorption. The rays normal to front end 30 go directly toward shutter 38, while rays entering front end 30 from other angles are reflected from the inner walls of the rod. The rays are restored to their original angles as they leave the rod, passing through back end 52.

As long as shutter 38 is closed, no rays reach sensor 40. When mechanism 48 opens shutter 38, infrared rays reach the sensor 40 which responds with output signal V. That signal is treated by first signal conditioner 54 and passes to microprocessor 60 by way of multiplexer 58. Microprocessor 60 converts the signal into a digital format. At a specific moment, either before or after shutter activation, signal $T_a$ is taken from ambient sensor 44, through second signal conditioner 56, to microprocessor 60. When both signals are received, microprocessor 60 calculates $T_b$ according to an algorithm based on equation 2, and sends the result of the calculation to display 64.

One advantage of using a refractive waveguide 42 instead of the prior art hollow reflective tube, is the extremely low loss in the total internal reflection as compared to losses from reflection from a mirrored surface.

For example, the coefficient of reflectivity in a gold plated tubular waveguide is typically 0.98 which, after for example 10 reflections, is equivalent to a transmission coefficient of 0.82. By contrast, a refractive waveguide has total internal reflection with almost 100% efficiency resulting in negligible loss after virtually any number of reflections.

Furthermore, change in temperature of a hollow reflective waveguide may cause stray radiation which would be detected by the sensor. This is because the 0.02 emissivity of gold grows much higher as the emission angles approach 90 degrees to normal. Stray emissions from a reflective waveguide alter the magnitude of thermal radiation at the infrared sensor and cause a measurement error.

By contrast, a refractive rod with low absorption in the wavelength of interest has extremely small emissivity which adds no significant error.

Refractive materials operating in the near and far infrared spectral ranges generally have high refractive indices, preferably greater than 2.0, typically 2.5 or more. This results in relatively small angles of total internal reflection, typically less than 23 degrees. It also results in a very wide angle of entry for a flat surface at the front end of the refractive waveguide rod. The maximum angle of entry theoretically is 90 degrees to normal, however, in practice it is somewhat smaller.

To be effective and commercially viable, waveguides of any design, be it reflective or refractive, must have the following properties: low infrared loss, low emissivity, resistance to pollutants, and chemical stability. It is also desirable for a waveguide to not only channel thermal radiation toward the sensor, but to be able to control the field of view of the probe. The waveguide must also be inexpensive and easy to fabricate. Virtually all these requirements can be fulfilled with a refractive waveguide of the present invention, such as the waveguide shown in FIG. 2.

For practicality of design in some thermometers, it may be desirable to be able to channel the infrared rays along curved paths. FIG. 3 shows a refractive, curved rod 80 for that purpose. Due to a high refractive index, the rod can be curved to relatively small radii without losing the advantages of total internal reflection.

Figure 10:
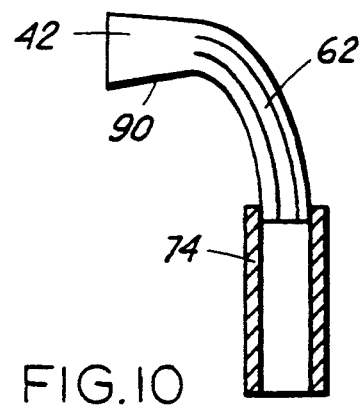
FIG. 10 is a partial cross section view of a unitary optical system comprising refractive and reflective waveguides.

In some applications it may be desirable, as shown in FIG. 4, to combine a refractive waveguide rod 32, and a reflective waveguide 74. In this system, light enters rod 32 and propagates through it by means of total internal reflections. Upon exiting rod 32 it continues to propagate toward infrared sensor 40 by means of surface reflections from the highly reflective surface 76 of elongated tubular reflective waveguide 74. The unitary system shown in FIG. 10 combines a plurality of parallel refractive waveguide rods 62 in optical series with reflective waveguide 74.

In the infrared range, a refractive rod has quite a small angle of total internal reflection resulting in a very wide field of view. For some applications a narrower field of view may be desirable. This can be accomplished by forming one or both ends of the rod with a concave profile as in FIG. 5. This would result in an angle of view 84 that is narrower than the angle of view 86 of the flat rod end shown in FIG. 6.

An optical system made according to the present invention will usually have a refractive waveguide with a small length to diameter ratio. A waveguide in a medical thermometer, for example, is characterized by a length to width ratio of between 5 and 10. It is, however, within the contemplation of the invention that the waveguide rod can have a high length to diameter ratio, as high as 100 to 1 or more. This permits having a thermometer with an extended probe capable of reaching into deep cavities.

Use of a high refractive index material for a waveguide rod results in low losses from internal reflection as discussed above. It does, however, result in high reflective loss at the exit and entry surfaces of the rod. The reflective loss is typically over 30%, and can be as high as 55% for such rod materials as germanium and silicon. The use of anti-reflective coating (ARC) normally used on lenses to reduce entry and exit losses works well with refractive rods of the present invention. The coatings are composed of one or several thin materials which provide a closer match between the refractive material and the medium outside the end of the rod. The selection of the type of ARC coating is optimized for the wavelength of interest. For a medical thermometer, the wavelengths of interest are generally between 3 and 20 μm.

For detection of infrared radiation that is of low magnitude, the entry surface of the rod is enlarged, given a larger cross sectional surface area. The rod is then tapered down 90 with a gradual reduction along the length as shown in FIG. 7, providing the smaller end for transmission toward the sensor. If the surface of entry is flat, an acceptance angle (angle of entry) may be too narrow or too wide for a particular application. This can be corrected by also forming the surface of entry in a convex or concave shape. As shown in FIG. 8, the front may be made convex 92 to widen the acceptance angle.

Figure 9:
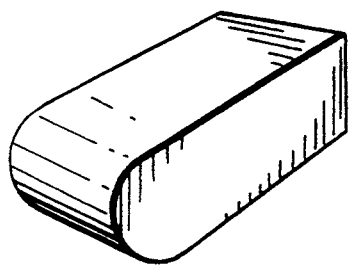
FIG. 9 is a perspective view of another shaped refractive waveguide according to the present invention.

The refractive infrared waveguide may be take any shape in cross section and at each end, for example as the one shown in FIG. 9, as may be suited for infrared radiation acceptance by the waveguide, and/or delivery toward the sensor within the thermometer body.

Although the invention has been described in terms of specific preferred embodiments, it will be obvious to one skilled in the art that various modifications and substitutions are contemplated by the invention disclosed herein and that all such modifications and substitutions are included within the scope of the invention as defined in the appended claims.

I claim:

1. In an optical infrared ear insertion thermometer for collection of infrared radiation from a tympanic membrane and surrounding tissue within an ear, comprising a housing, an infrared sensor mounted on said housing, and waveguide means carried by said housing, in optical alignment with said sensor, for directing infrared radiation received by said thermometer from an object, the temperature of which is to be measured, in a path toward said sensor for reception by said sensor, the improvement comprising:

said waveguide means comprising a refractive waveguide having a core medium of which the refractive index is consistently higher than the refractive index of the immediate surrounding of the waveguide, whereby said waveguide is capable of transmitting infrared radiation along the length of the waveguide by total internal reflection within said medium, said refractive waveguide being a rod with a single core.

2. The thermometer of claim 1, further comprising: said refractive waveguide being a sequential optical portion of said path.

3. The thermometer of claim 2, further comprising: a first end face of said refractive waveguide core being curved.

4. The thermometer of claim 3, further comprising: said first end face of said core being convex.

5. The thermometer of claim 3, further comprising: said first end face of said core being concave.

6. The thermometer described in claim 2, further comprising: a reflective waveguide juxtaposed to said core to form a continuous optical path.

7. The thermometer of claim 2, further comprising: said refractive waveguide core of said thermometer comprising a first end face and a second end face, said first end face having a greater cross sectional area than said second end face, said core being tapered between said first and said second end faces.

8. The thermometer of claim 7, further comprising: said first end face of greater cross sectional area of said core, being curved.

9. The thermometer of claim 2, further comprising: a first end of said refractive waveguide including an anti-reflective lens coating suitable for reducing loss of radiation in wavelengths between 3 and 20 $\mu$m from reflection when passing through said first end.

10. The thermometer of claim 2, further comprising: said core having a first end and a second end, and being curved between said ends.

11. The thermometer of claim 1, further comprising: said core of said refractive waveguide being of a material having a refractive index greater than 2.0.

12. In an optical infrared thermometer comprising a body, a probe mounted on said body and having a shape and dimension that is compatible with the profile of an ear canal for insertion into said ear canal, short of the tympanic membrane of said ear, for gathering infrared radiation from said tympanic membrane an surrounding tissue, and an infrared sensor mounted on said body, the improvement comprising:

a refractive waveguide rod, having a sole core the refractive index of which is consistently higher than the immediate surrounding of said rod and greater than 2, supported in an optical path between said probe and said sensor for conducting said infrared radiation from said probe toward said sensor.

13. In an optical infrared ear insertion thermometer for collection of infrared radiation from a tympanic membrane and surrounding tissue within an ear, comprising a body, a probe on said body for receiving infrared radiation, and a sensor on said body, said sensor being for providing a signal representative of said radiation, the improvement comprising:

a plurality of parallel refractive waveguide cores supported in an optical path between said probe and said sensor for conducting said infrared radiation from said probe toward said sensor, wherein said cores individually comprise an internal medium surrounded by an outer layer, wherein further said internal medium has a refractive index that is higher than the refractive index of said outer layer.

14. The thermometer described in claim 13, further comprising: a unitary optical system comprising said plurality of parallel refractive waveguide cores in optical series with a reflective waveguide.

15. The thermometer described in claim 14, further comprising said unitary optical system comprising a first end face and a second end face, said first end face having a greater cross sectional area than said second end face, said unitary optical system being tapered between said first and said second end faces.

16. An apparatus for measuring the IR radiation associated with a tympanic membrane without contacting said membrane, said apparatus comprising:

a housing;

a sensor mounted within said housing, wherein said housing includes an IR transmission opening for passing of IR radiation between the membrane and said sensor; means for converting said IR radiation, detected by said sensor, into a signal corresponding to a temperature of the membrane; and a wave guide formed of a solid optic core capable of transmitting said IR radiation in sufficient quantities to ascertain said membrane temperature, wherein said core is further encased with a separate optic sheath having a lower refractive index than said core, wherein said core further comprises at least one end thereof having a contoured surface to enhance IR radiation transmission between the membrane and said sensor.

17. The apparatus of claim 16 wherein said optic core includes an IR radiation reception end and an IR broadcast end and said contoured surface is on said reception end and provides a curved interface for a wide angle view of the membrane.

18. The apparatus of claim 16 wherein said contained surface includes an IR broadcast end that provides a focused emittance of said IR radiation directed at said sensor.

* * * * *